(12) United States Patent
Sung et al.

(10) Patent No.: US 10,318,277 B2
(45) Date of Patent: *Jun. 11, 2019

(54) METHOD AND APPARATUS FOR AUTO INSTALLING APPLICATION INTO DIFFERENT TERMINALS

(71) Applicant: SAMSUNG ELECTRONICS CO., LTD., Suwon-si (KR)

(72) Inventors: Youl-woong Sung, Suwon-si (KR); Jong-baek Kim, Suwon-si (KR); Il-joo Kim, Seoul (KR); Young-chul Sohn, Seoul (KR); Soo-min Shin, Suwon-si (KR); Ho Jin, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/723,789

(22) Filed: Oct. 3, 2017

(65) Prior Publication Data

US 2018/0024829 A1     Jan. 25, 2018

Related U.S. Application Data

(63) Continuation of application No. 14/867,653, filed on Sep. 28, 2015, now Pat. No. 9,841,967, which is a
(Continued)

(30) Foreign Application Priority Data

Nov. 17, 2011   (KR) ................. 10-2011-0120323

(51) Int. Cl.
*G06F 9/44*       (2018.01)
*G06F 8/65*       (2018.01)
(Continued)

(52) U.S. Cl.
CPC .............. *G06F 8/65* (2013.01); *G06F 8/61* (2013.01); *G06F 8/62* (2013.01); *H04L 67/34* (2013.01)

(58) Field of Classification Search
CPC ....................................................... G06F 8/65
(Continued)

(56) References Cited

U.S. PATENT DOCUMENTS 5,379,429 A        1/1995   Hirasawa et al.
5,835,911 A  *   11/1998   Nakagawa ............... G06F 8/65
(Continued)

FOREIGN PATENT DOCUMENTS

JP      2004-523328 A      8/2004
JP      2004-302498 A     10/2004
(Continued)

OTHER PUBLICATIONS

Liu et al, "Effective and Efficient Update of XML in RDBMS", ACM, pp. 925-936, 2005 (Year: 2005).*
(Continued)

*Primary Examiner* — Anil Khatri
(74) *Attorney, Agent, or Firm* — Sughrue Mion, PLLC

(57) ABSTRACT

An apparatus and method of automatically installing an application in different terminals by storing terminal information of a user and allowing the user to install an application when the user installs an application in at least two terminals, and in which an installation process may be automatically conducted is provided. Information related to an application installed in a first terminal is received from the first terminal; and a second terminal is requested to install another application corresponding to the application, in the second terminal, by using the received information related to the application.

18 Claims, 7 Drawing Sheets

Related U.S. Application Data continuation of application No. 13/562,926, filed on Jul. 31, 2012, now Pat. No. 9,164,745.

(51) Int. Cl.
*G06F 8/61* (2018.01)
*H04L 29/08* (2006.01)

(58) Field of Classification Search
USPC .................................. 717/172–177; 709/203
See application file for complete search history.

(56) References Cited

U.S. PATENT DOCUMENTS

| | | |
|---|---|---|
| 5,872,979 A | 2/1999 | Edel et al. |
| 6,115,549 A | 9/2000 | Janis et al. |
| 6,374,402 B1 | 4/2002 | Schmeidler et al. |
| 6,389,592 B1 | 5/2002 | Ayres et al. |
| 6,502,124 B1 | 12/2002 | Shimakawa et al. |
| 6,529,946 B2* | 3/2003 | Yokono .................. G06F 21/10 709/217 |
| 6,681,390 B2 | 1/2004 | Fiske |
| 7,000,230 B1 | 2/2006 | Murray et al. |
| 7,155,713 B1 | 12/2006 | Burkhardt et al. |
| 7,185,335 B2* | 2/2007 | Hind ........................ G06F 8/62 714/E11.146 |
| 7,237,001 B2* | 6/2007 | Yokono .................. G06F 21/10 360/55 |
| 7,389,504 B2 | 6/2008 | Kawano et al. |
| 7,401,120 B2 | 7/2008 | Walbeck et al. |
| 7,526,762 B1 | 4/2009 | Astala et al. |
| 7,600,228 B2* | 10/2009 | Takekawa ............. G06F 21/123 235/380 |
| 7,643,826 B2 | 1/2010 | Brunet et al. |
| 7,673,148 B2* | 3/2010 | Zou ........................ G06F 8/61 380/201 |
| 7,779,406 B2 | 8/2010 | Blanding et al. |
| 7,802,243 B1 | 9/2010 | Feeser et al. |
| 7,805,719 B2 | 9/2010 | O'Neill |
| 7,810,089 B2* | 10/2010 | Sundarrajan .............. G06F 8/61 717/174 |
| 7,827,549 B2 | 11/2010 | Tarassov |
| 7,861,242 B2 | 12/2010 | Rygaard |
| 7,945,897 B1* | 5/2011 | Cook ........................ G06F 9/445 709/226 |
| 7,970,923 B2* | 6/2011 | Pedersen ............. H04L 63/0272 709/219 |
| 7,979,515 B2 | 7/2011 | Morikawa |
| 8,032,879 B2 | 10/2011 | Nathan et al. |
| 8,037,469 B2 | 10/2011 | Newman et al. |
| 8,051,416 B2 | 11/2011 | Grund et al. |
| 8,074,212 B2 | 12/2011 | Li et al. |
| 8,126,813 B2 | 2/2012 | Nagao |
| 8,176,481 B2 | 5/2012 | Kasahara |
| 8,387,112 B1 | 2/2013 | Ranjan et al. |
| 8,402,453 B2* | 3/2013 | Gupta ....................... G06F 8/65 717/172 |
| 8,402,454 B2* | 3/2013 | Wang ....................... G06F 8/656 717/172 |
| 8,423,604 B2 | 4/2013 | Johnson |
| 8,479,190 B2 | 7/2013 | Sueyoshi et al. |
| 8,505,005 B1* | 8/2013 | Bos ........................... G06F 8/61 717/177 |
| 8,527,982 B1 | 9/2013 | Sapuntzakis et al. |
| 8,533,708 B2 | 9/2013 | Kamada et al. |
| 8,539,051 B2 | 9/2013 | Lankes et al. |
| 8,606,892 B2* | 12/2013 | Mallur ..................... G06F 8/65 709/203 |
| 8,725,846 B2 | 5/2014 | Yamazaki |
| 8,732,691 B2 | 5/2014 | Ryu et al. |
| 8,745,617 B1* | 6/2014 | Stekkelpak ......... G06F 9/44505 717/173 |
| 8,762,988 B2 | 6/2014 | Kong et al. |
| 8,768,306 B1 | 7/2014 | Ben Ayed |
| 8,839,234 B1 | 9/2014 | Voronkov et al. |
| 8,850,421 B2 | 9/2014 | Proud |
| 8,914,794 B2 | 12/2014 | Bliss et al. |
| 8,924,952 B1 | 12/2014 | Hou |
| 8,930,940 B2* | 1/2015 | Xu ............................ G06F 8/61 717/175 |
| 8,938,734 B2 | 1/2015 | Misovski et al. |
| 9,038,052 B2 | 5/2015 | Ishimoto |
| 9,164,745 B2* | 10/2015 | Sung ........................ G06F 8/61 |
| 9,172,657 B2 | 10/2015 | Catrien et al. |
| 9,626,178 B2 | 4/2017 | Sung et al. |
| 9,715,381 B2* | 7/2017 | Tokunaga ............... H04L 67/02 |
| 2004/0242216 A1 | 12/2004 | Boutsikakis et al. |
| 2006/0265708 A1 | 11/2006 | Blanding et al. |
| 2011/0010704 A1 | 1/2011 | Jeon et al. |
| 2011/0028803 A1 | 2/2011 | Ollmar |
| 2011/0034188 A1 | 2/2011 | Bengtsson et al. |

FOREIGN PATENT DOCUMENTS

| | | |
|---|---|---|
| KR | 1020020071151 A | 9/2002 |
| KR | 1020020077718 A | 10/2002 |
| KR | 1020050073086 A | 7/2005 |
| KR | 1020070049095 A | 5/2007 |
| KR | 10-2007-0097819 A | 10/2007 |
| KR | 1020080046013 A | 5/2008 |
| KR | 10-2009-0043682 A | 5/2009 |
| KR | 1020110004650 A | 1/2011 |
| KR | 10-1440735 B1 | 9/2014 |
| RU | 2519955 C1 | 6/2014 |
| RU | 2521254 C1 | 6/2014 |
| WO | 2015/058286 A1 | 4/2015 |

OTHER PUBLICATIONS

Jaffe et al, "Automatic Update of Replicated Topology Data Bases", ACM, pp. 142-148, 1984 (Year: 1984).*
Herrick et al, "Sustainable Automated Software Deployment Practices", ACM, pp. 189-196, 2013 (Year: 2013).*
Marquardt, "Patterns for Software Release Versioning", ACM, pp. 1-13, 2010 (Year: 2010).*
Tyndall, "Building an Effective Software Deployment Process", ACM, pp. 109-114, 2012 (Year: 2012).*
Srikanth et al, "Software Installation on a Huge Heterogeneous Network using Mobile Agents", IEEE, pp. 1-4, 2007 (Year: 2007).*
Communication dated Apr. 2, 2018, issued by the Korean Intellectual Property Office in counterpart Korean Patent Application No. 10-2011-0120323.
Search Report dated Dec. 5, 2016, issued by the International Search Authority in counterpart International Patent Application No. PCT/KR2016/009522 (PCT/ISA/210).
Written Opinion dated Dec. 5, 2016, issued by the International Search Authority in counterpart International Patent Application No. PCT/KR2016/009522 (PCT/ISA/237).
Communication dated Oct. 18, 2017, issued by the Korean Intellectual Property Office in corresponding Korean Application No. 10-2011-0120323.
Cader et al, "Multi-version Software Updates", IEEE, pp. 36-40, 2012.
Herrick et al, "Sustainable Automated Software Deployment Practices", ACM, pp. 189-196, 2013.
Hosek et al, "Safe Software Updates via Multi-version Execution", IEEE, pp. 612-621, 2013.
Manna, "Dynamic Software Update for Component-based Distributed Systems", ACM, pp. 1-8, 2011.
Pukall et al,"JavAdaptor: Unrestricted Dynamic Software Updates for Java", ACM, pp. 989-991, 2011.
Subramanian et al, "Dynamic Software Updates: A VM-centric Approach", ACM, pp. 1-12, 2009.
Tyndall, "Building an Effective Software Deployment Process", ACM, pp. 109-114, 2012.
Wahler et al, "Dynamic Software Updates for Real-Time Systems", ACM, pp. 1-6, 2009.

(56) References Cited

OTHER PUBLICATIONS

Belguidoum et al, "Analysis of deployment dependencies in software components," ACM, pp. 735-736, 2006.
Alpern et al, "PDS: A Virtual Execution Environment for Software Deployment", ACM, pp. 175-185, 2005.
Marquardt "Patterns for Software Release Versioning", ACM, pp. 1-13, 2010.
Becker et al, "Managing Combinatorial Software Installations with Spack", IEEE, pp. 14-23, 2016.
Vouillon wt al, On Software Component Co-Installability, ACM Transactions on Software Engineering and Methodology, vol. 22, No. 4, Article 34, pp. 1-35, 2013.
Kotziampasis et al, "Seamlessly Integrated Distributed Shared Virtual Environments", ACM, pp. 138-147, 2004.
Aasbakken et al, "Evaluation of User Engagement and Message Comprehension in a Pervasive Software Installation", IEEE, pp. 27-30, 2012.
Cheng et al, "The Implementation of Supporting Uniform Data Distribution with Software-Dened Storage Service on Heterogeneous Cloud Storage", IEEE, pp. 610-615, 2016.

\* cited by examiner

METHOD AND APPARATUS FOR AUTO INSTALLING APPLICATION INTO DIFFERENT TERMINALS

CROSS-REFERENCE TO RELATED PATENT APPLICATION

This application is a Continuation of U.S. application Ser. No. 14/867,653, which is a Continuation of U.S. application Ser. No. 13/562,926, filed on Jul. 31, 2012, and claims priority from Korean Patent Application No. 10-2011-0120323, filed on Nov. 17, 2011, in the Korean Intellectual Property Office, the disclosures of all of which are incorporated herein in their entirety by reference.

BACKGROUND

1. Field

Methods and apparatuses consistent with the exemplary embodiments relate to an apparatus and method for automatically installing an application in different terminals by storing terminal information of a user and allowing the user to install an application when the user installs an application in at least two terminals, and in which an installation process may be automatically conducted.

2. Description of the Related Art

As the performance of terminals has increased and the internet is widely distributed, various applications may be installed and used in a portable terminal. Moreover, a user may increasingly own several terminals such as a smartphone, a MP3 player, a tablet personal computer (PC), television (TV), and the like, and use at least two of the terminals in connection with each other.

In this case, the user installs applications in each terminal, and sometimes a predetermined application may be installed in at least two terminals. Then the user has to select operable applications for each terminal.

In particular, in cases as discussed below, the user has to select operable applications for each terminal for installation:
- when use of a single application in different terminals is wanted,
- when different applications are to be installed in an environment in which a terminal operates (for example, operating system (OS)),
- when there are special applications suitable for the characteristics of a terminal (for example, when there are an application for TV and an application for a mobile terminal, respectively),
- when at least two applications are installed in different terminals and operate in connection (for example, when a server application is installed in a TV, and a client application is installed in a mobile phone to provide services),
- when the same application (or related applications) installed in at least two terminals is renewed by a newer version of the application, and
- when an application is to be installed in a terminal by a friend's recommendation.

In cases as described above, if the user wants to remove the same application installed in various terminals of the user, the user inconveniently has to remove the application from each of the terminals.

SUMMARY

The exemplary embodiments provide an apparatus and method for automatically installing an application in different terminals.

According to an aspect of the exemplary embodiments, there is provided a method of automatically installing an application in different terminals, the method comprising: receiving information related to a first application installed in a first terminal, from the first terminal; and requesting a second terminal to install a second application corresponding to the first application, in the second terminal, by using the received information related to the first application.

The request to install the second application in the second terminal may comprise determining the second application corresponding to the first application installed in the first terminal, in consideration of installation environments of the second terminal.

The request to install the second application in the second terminal may comprise determining an application that is connectable to the application installed in the first terminal, as the second application corresponding to the first application.

The method may further comprise: receiving information related to an update of an application conducted by the first terminal, from the first terminal; and requesting to conduct an update of a corresponding second application in the second terminal, in which the second application corresponding to the updated application is installed.

The method may further comprise: receiving information related to removal of an application conducted by the first terminal, from the first terminal; and requesting to remove the corresponding application in the second terminal in which the application corresponding to the removed application is installed.

When users of the second terminal and the first terminal are different, the method may further comprise determining whether to install the corresponding application according to user rights information indicating whether the user of the first terminal is allowed to install an application in the second terminal or by approval of the user of the second terminal.

The user rights information may be set up by referring to information about a relationship between the users of the first terminal and the second terminal.

According to another aspect of the exemplary embodiments, there is provided a method of automatically installing a second application in a second terminal, the method comprising: receiving information related to a first application installed in a first terminal, from a server; and installing the second application corresponding to the first application by using the information related to the first application.

The installing the second application may comprise determining the second application corresponding to the first application in consideration of installation environments of the second terminal.

The installing the second application may comprise determining an application that is connectable to the first application installed in the first terminal, as the second application corresponding to the first application.

The method may further comprise: receiving information related to an update of an application conducted by the first terminal, from the server; and updating an application corresponding to the updated application.

When users of the first terminal and the second terminal are different, the method may further comprise determining whether to install the corresponding application according to user rights information indicating whether the user of the first terminal is allowed to install an application in the second terminal or by approval of the user of the second terminal.

The user rights information may be set up by referring to information about a relationship between the users of the first terminal and the second terminal.

According to another aspect of the exemplary embodiments, there is provided a method of automatically storing contents in different terminals, the method comprising: receiving information related to first contents downloaded to a first terminal, from the first terminal; and transmitting second contents corresponding to the first contents to a second terminal by using the received information related to the first contents.

According to another aspect of the exemplary embodiments, there is provided a method of automatically storing contents in a terminal device, the method comprising: receiving information related to first contents stored in a first terminal, from a server; and receiving second contents corresponding to the first contents from the server by using the received information related to the first contents.

According to another aspect of the exemplary embodiments, there is provided a server for automatically installing an application in different terminals, the server comprising: a communication unit communicating with a plurality of terminal devices; a storage unit storing information about a first terminal received via the communication unit; and a service providing unit providing a service to install an application corresponding to an application installed in the first terminal, in a second terminal, by using the information about the first terminal stored in the storage unit.

According to another aspect of the exemplary embodiments, there is provided a terminal comprising: a communication unit communicating with a server; and a control unit controlling to receive information related to a first application installed in another terminal from the server via the communication unit, and to install a second application corresponding to the first application by using the received information related to the first application.

BRIEF DESCRIPTION OF THE DRAWINGS

The above and other aspects will become more apparent by describing in detail exemplary embodiments thereof with reference to the attached drawings in which.

DETAILED DESCRIPTION OF THE EXEMPLARY EMBODIMENTS

Figure 1:
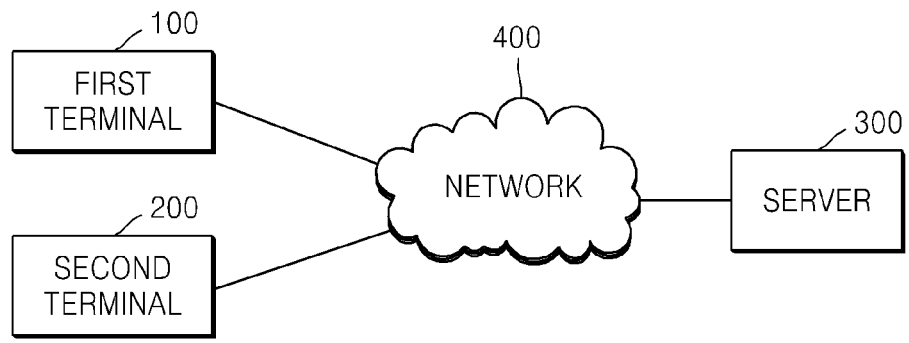
FIG. 1 is a block diagram illustrating a system for automatically installing an application in various terminals according to an exemplary embodiment.

Hereinafter, exemplary embodiments will be described with reference to the attached drawings. In the description of the exemplary embodiments and the attached drawings, certain detailed explanations of related art are omitted when it is deemed that they may unnecessarily obscure the essence of the exemplary embodiments. Also, like reference numerals denote like elements throughout the specification. Expressions such as "at least one of," when preceding a list of elements, modify the entire list of elements and do not modify the individual elements of the list.

The meaning of the terms used in the present specification and claims of the exemplary embodiments should not be limited to be of ordinary or literary meaning but should be construed as meanings and concepts not departing from the spirit and scope of the exemplary embodiments based on the principle that the exemplary embodiments define concepts of terms in order to describe the exemplary embodiments in the most appropriate way. Accordingly, the features disclosed in the exemplary embodiments and drawings of the present specification are examples of exemplary embodiments, and thus it should be understood that there are alternative equivalents or variation examples that can replace the exemplary embodiments at the point of the filing of the present application.

FIG. 1 is a block diagram illustrating a system for automatically installing an application in various terminals according to an exemplary embodiment.

Referring to FIG. 1, the system for automatically installing an application in different terminals may include a plurality of terminals such as a first terminal 100 and a second terminal 200, a server 300, and a network 400. Here, a terminal in which an application is installed first will be referred to as the first terminal 100, and a terminal in which another application corresponding to the application first installed in the first terminal 100 is installed by the server 300 will be referred to as the second terminal 200.

The server 300 is a server device that provides a service of automatically installing an application in different terminals via the network 400. In detail, the server 300 receives information related to a first application installed in the first terminal 100 from the first terminal 100 and installs a second application corresponding to the first application, in the second terminal 200. The server 300 according to the current exemplary embodiment stores relevant information for automatically installing an application in a plurality of terminals; for example, the server 300 stores application installation information, user information of each terminal, user relationship information, etc. but may not store installation files for installing applications.

A terminal such as the first terminal 100 and the second terminal 200 may be devices in various forms used by the user, such as a personal computer (PC), a laptop computer, a mobile phone, a tablet PC, a navigation terminal, a smartphone, a personal digital assistant (PDA), a smart TV, a portable multimedia player (PMP), or a digital broadcasting receiver. However, these are merely examples, and other than the above examples, communication devices which are currently developed and commercialized or devices which are to be developed later should be included in the concept of the terminal.

In the system of automatically installing an application in different terminals, the terminal described above may receive a message requesting to perform an installation of a second application corresponding to the first application installed in the first terminal 100 from the server 300 and install the second application, or may transmit application information installed in the terminal to the server 300 so that a second application corresponding to the first application is installed in another terminal such as a second terminal 200.

Here, the second application corresponding to the first application refers to the same application as the application installed in the first terminal, an application having the same contents but differing in terms of a version or platform as installation conditions of a terminal for installation are considered, or an application that is installed in the second terminal 200 so as to be executed in connection with the application of the first terminal 100.

The network 400 provides a path for transmission and reception of data between the server 300 and the first and second terminals 100 and 200. The network 400 is an internet protocol (IP) network through which transmission and reception services of large capacity data are provided; the network 400 may be an ALL IP network in which different networks are integrated based on IP. In addition, the network 400 may include at least one selected from the group consisting of a wired network, a Wireless Broadband (Wibro) network, a 3 Generation mobile network including Wideband Code Division Multiple Access (WCDMA), a high speed downlink packet access (HSDPA) network, and a 3.5 Generation mobile network including a long term evolution (LTE) network, a 4 Generation mobile network including a LTE advanced network, a satellite network, and a wireless LAN including Wireless-Fidelity (Wi-Fi) network.

Figure 2:
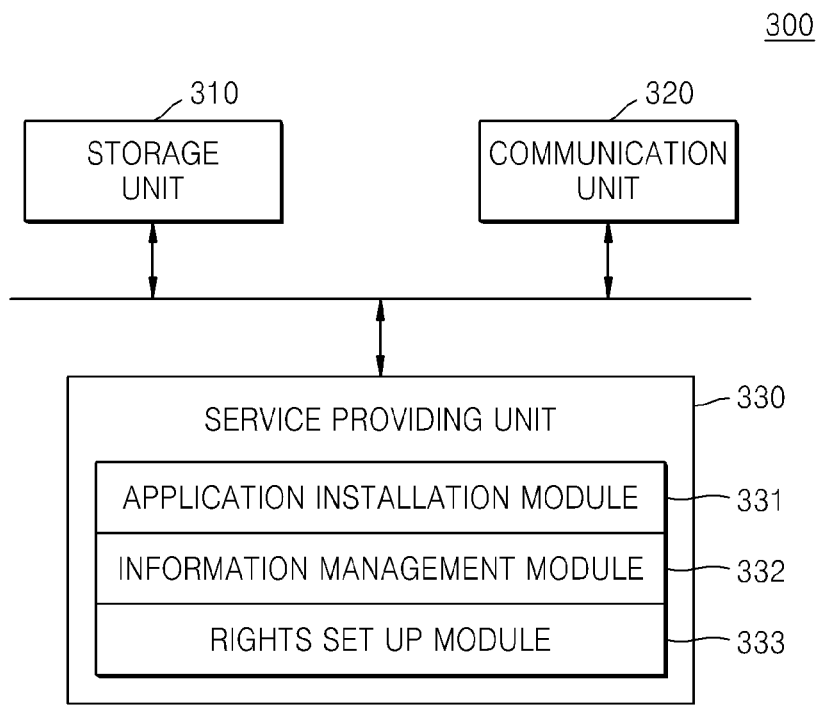
FIG. 2 is a block diagram illustrating a structure of a server for providing a service of automatically installing an application in different terminals according to an exemplary embodiment.

FIG. 2 is a block diagram illustrating a structure of a server 300 for providing a service of automatically installing an application in different terminals according to an exemplary embodiment.

Referring to FIG. 2, the server 300 of the system for automatically installing an application in various terminals may include a storage unit 310, a communication unit 320, and a service providing unit 330.

The storage unit 310 is used to store data and programs for operating the server 300, and may store, for example, application information installed in each terminal, user information including information of a terminal that is being used, or user relationship information. The storage unit 310 of the server 300 will be described in detail with reference to FIG. 4.

The communication unit 320 transmits or receives data to or from various terminals via the network 400.

The service providing unit 330 may include an application installation module 331 that provides services to install a second application corresponding to the first application installed in the first terminal 100, in the second terminal 200, an information management module 332 that renews and manages relevant information as applications are installed in the first and second terminals 100 and 200, and a rights setup module 333 that sets up and manages information about the rights of a user of each terminal, which is used to determine whether an application is to be automatically installed in another terminal or not.

Figure 4:
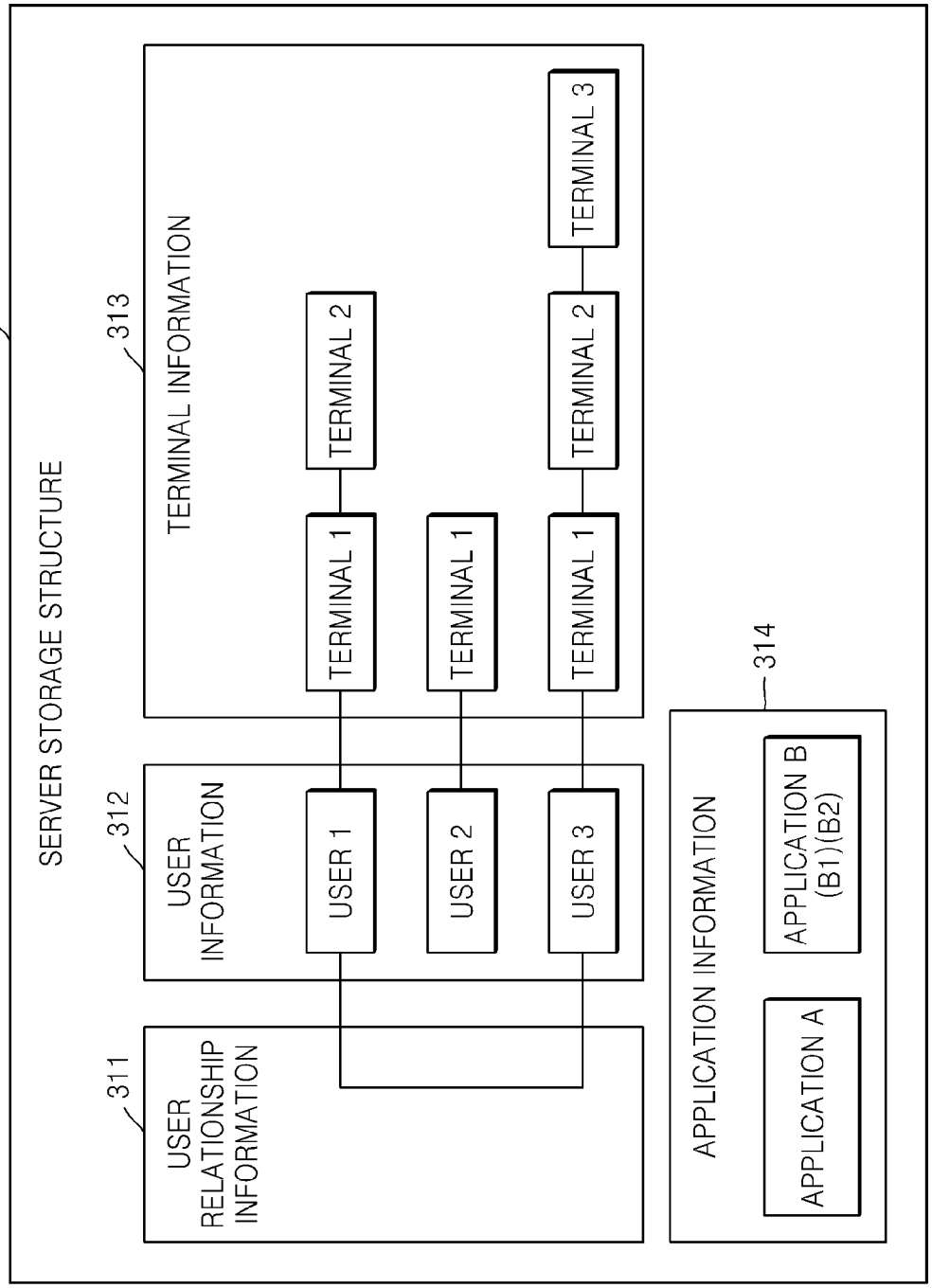
FIG. 4 is a block diagram illustrating a structure of information stored in a server for automatically installing an application in different terminals according to an exemplary embodiment.

The application installation module 331 searches for a terminal in which an application is to be installed, by referring to user information 312 (FIG. 4), terminal information 313 (FIG. 4), and user relationship information 311 (FIG. 4) stored in the server 300, and determines whether the application is to be installed in the found terminal, with reference to application information 314 (FIG. 4). In detail, the application installation module 331 may search for a second terminal that is in used by a user of the first terminal 100 or a person involved with the user of the first terminal 100 and determine whether a second application corresponding to the application installed in the first terminal 100 may be installed in the second terminal or not. In addition, the application installation module 331 finally sends a message requesting to perform installation of an application with respect to the terminal in which it is determined that the second application can be installed, thereby proceeding with installation of the second application corresponding to the first application of the first terminal 100, in the second terminal 200.

The rights set up module 333 sets up rights of the user of the first terminal 100 for automatically installing an application in a terminal of another user who is different from the user of the first terminal 100. Rights are set up automatically by determining a relationship between users on the Internet such as social network services (SNS) or communities or according to a user's request. For example, in the case of a family relationship on the internet, and when automatically installing an application in a second terminal, rights may be set up such that an application may be installed without approval of a user of the second terminal. However, when the relationship between users is friends, rights may be set up such that the user of the first terminal 100 may be able to recommend applications only with respect to those applications that are installed by the user of the first terminal 100, and installation proceeds only when the user of the second terminal 200 allows the installation. The set up of rights may be automatically performed as described above, or a user of a terminal may connect to the server 300 directly and designate a user of another terminal in which the application is to be automatically installed.

The application installation module 331, the information management module 332, and the rights set up module 333 may be implemented by software, hardware, or a combination of software and hardware. For example, the modules may be stored in the storage unit 310 as programs, and may then be executed by the service providing unit 330.

Figure 3:
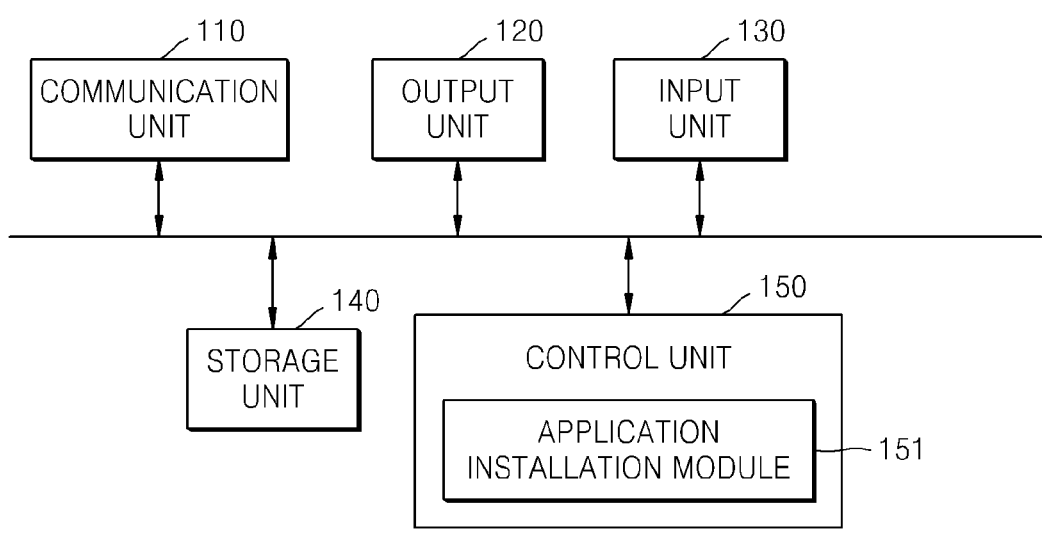
FIG. 3 is a block diagram illustrating a structure of a terminal which receives a service of automatically installing an application in different terminals according to an exemplary embodiment.

FIG. 3 is a block diagram illustrating a structure of a terminal which receives a service of automatically installing applications in different terminals according to an exemplary embodiment. The second terminal 200 described with reference to FIG. 1 may have the same structure as illustrated in FIG. 3.

Referring to FIG. 3, the first and second terminals 100 and 200 according to the current exemplary embodiment may include a communication unit 110, an output unit 120, an input unit 130, a storage unit 140, and a control unit 150.

The communication unit 110 transmits or receives data to or from the server 300 via the network 400.

The output unit 120 outputs a user interface on a screen so that an application may be installed via the user interface, and may be, for example, one of a liquid crystal display (LCD), a thin film transistor-liquid crystal display (TFT-LCD), a light emitting diode (LED), an organic light emitting diode (OLED), an active matrix organic light emitting diode (AMOLED), a flexible display, and a 3D display.

The input unit 130 generates a user input signal used to control or operate the first and second terminals 100 and 200 according to a user's manipulation, and may be formed of various input units. For example, the input unit 130 may include at least one selected from the group consisting of a key input unit, a touch input unit, a gesture input unit, and a sound input unit, but is not limited thereto. The key input unit generates a signal corresponding to a predetermined key according to a key manipulation, and may be, for example, a key pad or a keyboard. The touch input unit senses a portion of the touch input unit touched by a user to recognize an input operation, and may be, for example, a touch pad, a touch screen, or a touch sensor, but is not limited thereto. The gesture input unit recognizes predetermined appointed operations by a user such as shaking or moving a terminal, approaching the terminal, or blinks of eyes, as a predetermined input signal. The gesture input unit may be formed of at least one selected from the group consisting of a geomagnetic sensor, an acceleration sensor, a camera, an altimeter, a gyro sensor, and a proximity sensor.

The storage unit 140 stores data or programs needed to operate the first and second terminals 100 and 200 and may basically store an operating system (OS) of the first and second terminals 100 and 200 and at least one application program. The storage unit 140 may be any type of storage medium such as a read access memory (RAM), a read only memory (ROM), a hard disk drive (HDD), a flash memory, a CD-ROM, or DVD.

The control unit 150 controls the overall operations of the first and second terminals 100 and 200. The control unit 50 basically operates based on operation programs stored in the storage unit 140 and establishes a basic platform environment of the first and second terminals 100 and 200, and executes application programs according to a user's selection to provide predetermined functions. According to the current exemplary embodiment in which an application is installed according to a request from the server 300, the control unit 150 may include an application installation module 151 that controls another application corresponding to application information about the application that is installed in the first terminal 100 to be installed or transmits application information about that the application is installed in a terminal in which the control unit 150 is included, so that another application corresponding to the application installed in the terminal may be installed in another terminal.

The application installation module 151 may be implemented by software, hardware or a combination of software and hardware; for example, the application installation module 151 may be stored in the storage unit 140 as a program and may be executed by using the control unit 150.

FIG. 4 is a block diagram illustrating a structure of information stored in the server 300 for automatically installing an application in different terminals according to an exemplary embodiment.

Referring to FIG. 4, information for automatically installing an application in different terminals is stored in the storage unit 310 of the server 300. In detail, user relationship information 311, user information 312, terminal information 313, and application information 314 may be stored in the storage unit 310.

Terminal information of at least one terminal, to which automatic application installation services are to be provided, and user information of a user, who owns or uses the terminal, are included in the terminal information 313 and the user information 312, respectively. Also, information about installation environments about each terminal and information indicating whether a predetermined application may be installed, may be included in the terminal information 313. Also, the terminal information 313 may further include information related to application updates for each terminal or information related to removal of applications to thereby automatically update or remove the applications installed in a plurality of terminals owned by the same user or a user related to the user of the corresponding terminal.

The user relationship information 311 may include information about relationships between users and information about rights indicating whether an application may be installed in the terminal owned by another user. The information about rights may be generated by setting user's rights according to a set up by the user or by automatically setting user's rights according to the user relationship information 311 by referring to information on SNS (Social Networking Services) or communities.

The application information 314 includes information of an application that is to be installed automatically in different terminals. In particular, when a second application corresponding to a first application of the first terminal 100 is installed in the second terminal 200, for example, application set up information for installation in consideration of environment information of the second terminal 200 or user interface information which may vary according to terminals may be further included in the application information 314. That is, environment set up information that is to be automatically set up when an application is being installed in each type of terminals (e.g., TV, smartphone, navigation, etc.) or installation file information for each terminal, or information indicating whether the application may be used in connected with various terminals may be included in the application information 314. When the server 300 transmits a request message for installing an application to the second terminal 200, the application information 314, in which environment information of the second terminal 200 is considered, is also included so that when an application is installed in the second terminal 200, the environment of the second terminal 200 may be considered.

Figure 5:
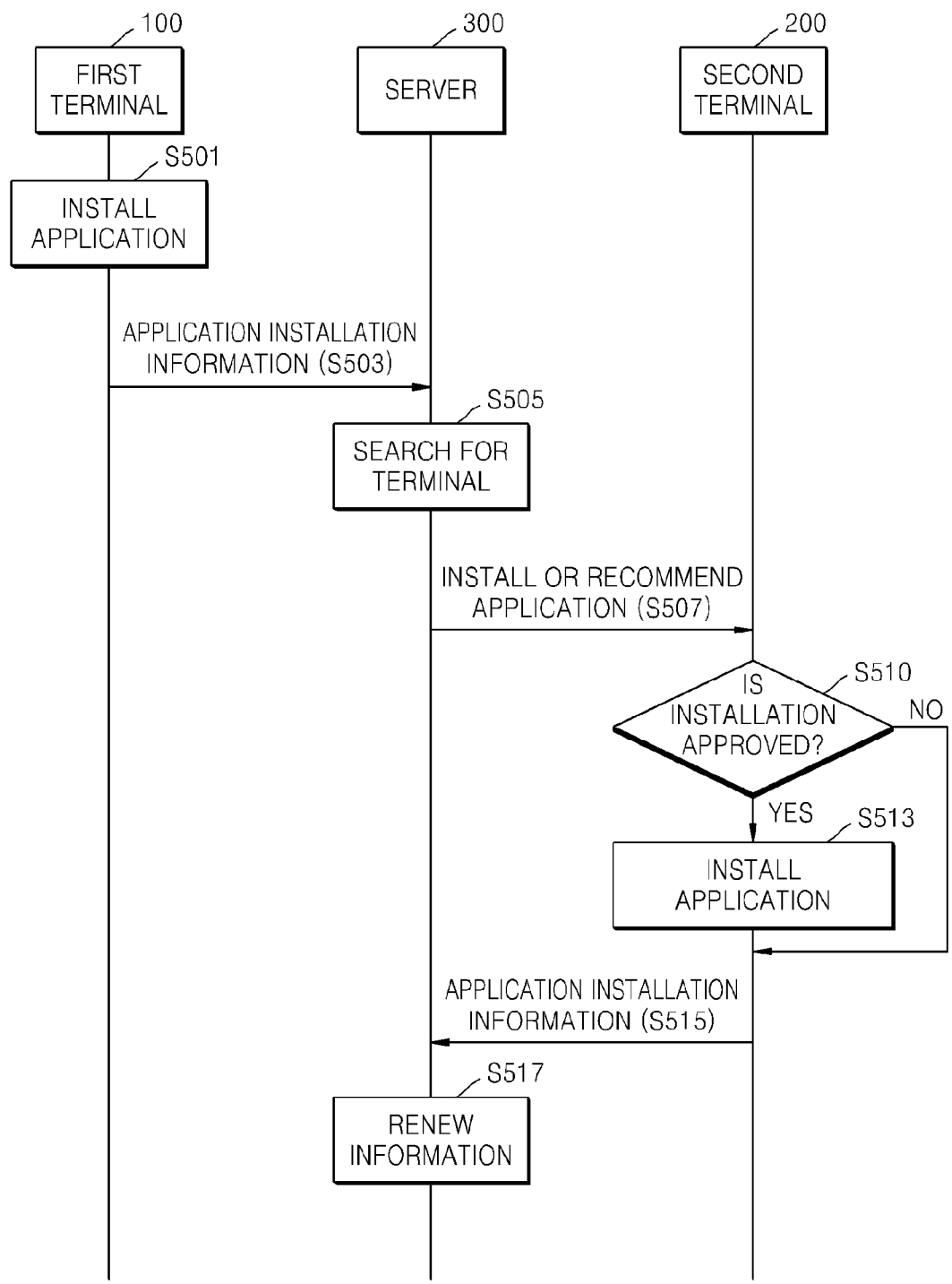
FIG. 5 is a flowchart illustrating a method of automatically installing an application in different terminals according to an exemplary embodiment.

FIG. 5 is a flowchart illustrating a method of automatically installing an application in different terminals according to an exemplary embodiment.

Referring to FIG. 5, when an application is installed in the first terminal 100 in operation S501, installation information about the application installed in the first terminal 100 is transmitted to the server 300 and stored in the terminal information 313 of the storage unit 310 in operation S503. This process may be performed by using the application management module 151 of the first terminal 100. Also, the application management module 151 may obtain information of applications that are already installed in the first terminal 100 and transmit the information obtained by the application management module 151 to the server 300.

The server 300, which has received information indicating that an application is installed in the first terminal 100, from the first terminal 100 searches for a terminal in which a second application corresponding to the first application installed in the first terminal 100 is not installed in operation S505, so that the second application is automatically installed by the server 300 in the terminal. Also, whether the second application may be installed in each terminal may be further determined to finally determine a terminal in which the second application may be installed.

When searching for a terminal in operation S505, even if users are not the same, terminals in which corresponding applications are not installed may also be included in the search according to the user relationship information 311. In this case, another application corresponding to the application installed in the first terminal 100 may be installed in the second terminal 200 according to rights of the user of the first terminal 100 with reference to user rights information included in the user relationship information 311 of the server 300 or a corresponding application may be installed when it is recommended to the user of the second terminal 200 and the user of the second terminal 200 agrees to installation thereof.

That is, the second terminal 200, which finally receives a request message for installing another application corresponding to the application installed in the first terminal 100, from the server 300, is another terminal owned by the same user of the first terminal 100 or a terminal, in which another application corresponding to the application installed in the first terminal 100 may be installed, when determining based on application information and terminal information included in a terminal of another user, which is recommended to install an application therein or about which the user has the rights to installing an application according to user relationship information.

In operation S507, in the second terminal 200, in which an application is to be installed, a corresponding application may be installed or recommended according to a user's rights. It is safe to give an installation command directly via the input unit of the second terminal 200, and thus when the user of the second terminal 200 agrees to installation of an application in operation S510, the application may be installed in operation S513. However, the process of approval of installation as described above may be omitted according to user set up, and also when installing an application in a terminal of another user, the installation may be performed directly without an installation approval process according to the set up rights of the user of the first terminal 100. Here, an application installation file may be obtained by requesting a file transmission to a device in which an installation file is stored, and accordingly, the server 300 may not store the installation file of the application.

Regardless of whether an application cannot be installed, or installation is not approved, or installation is successful, information related to the installation of an application in the second terminal 200 may be transmitted to the server 300 in operation S515 and stored in the terminal information 313 in operation S517.

With regard to an application that is to be installed in the second terminal 200, if an application cannot be installed in the second terminal 200 due to various reasons such as that environment information of the second terminal is different from that stored in the server 300 or application information thereof is different from actual information, the installation may be conducted later when installation becomes possible or it may be set such that reinstallation is not conducted with respect to the same application. Also, when installation is not approved, it may be regarded that the user of the second terminal 200 does not want installation, and then it may be set such that reinstallation is not tried with respect to the same application.

On the other hand, if there are at least two installable applications, the server 300 may automatically select an application that is operable faster in the second terminal 200 or an application that is preferred by a user who uses the same type of terminal as the second terminal 200 or users who are related to the user of the second terminal as included in the user relationship information 311, and may transmit a request message for installing the application. For example, if there are various versions of an application and at least two of the versions may be installed in a terminal, the server 300 may select the latest version of an application or an application that is executable in an optimum condition when installed in the second terminal 200 or select an application that is determined as being preferred based on a high frequency of installation by other terminal users and allow installation of the same. This may apply not only to installation of applications but update of applications. That is, it may be chosen to select the latest version of an application or an application that is executable in an optimum condition or to select an application that is installed by many terminal users and thus determined as being highly preferred and update the same in the second terminal 200.

Also, removal or update of applications may also be conducted in the same manner as installation. In brief, when an application is removed or updated from or in the first terminal 100, information corresponding to the removal or the update is transmitted to the server 300, and the server 300 searches for another terminal of the same user or for a terminal of another user according to user relationship information and finally selects a terminal in which the application, which was removed or updated in the first terminal 100, is included. Obviously, when updating, terminals that are already updated with the latest version of a corresponding application may be excluded. The server 300 transmits a message including information related to an application so as to remove or update an application with respect to the selected terminal, and the second terminal 200 which has received the message may remove or update the application according to approval of the user of the second terminal 200. The second terminal 200 which has conducted removal or update of the application may transmit information about the removal or update of the application, to the server 300, and may renew the application information 314 of the second terminal 200, which is stored in the server 300.

In addition, contents may also be stored, removed, or updated in a similar manner as applications. Installing applications in consideration of an environment of a terminal may correspond to setting up a condition such that contents are displayed on a terminal, in which the contents are stored, in the most proper way or to converting the contents. For example, when storing contents in a small compact terminal having a small screen size and a small storage capacity, a resolution of the contents may be reduced, and the second terminal 200 may be set according to an environment of a terminal so as to display contents in optimum conditions according to display information or the contents may be converted and then provided to the second terminal 200. Information about environment set up or conversion of contents suitable for each terminal is also stored in the server 300 and a message including information about set up or conversion to the second terminal 200, to which contents is to be transmitted, so that the second terminal 200 may store or convert contents suitable for its environment and store or reproduce the contents. When converting contents, contents conversion information may be used in converting contents in the server 300 so as to be suitable to the second terminal 200 and the converted contents may be transmitted to the second terminal 200, or the server 300 may transmit contents with the contents conversion information and the second terminal 200 may suitably convert the contents.

In addition, like applications, a contents file may be stored in a device other than the server 300, and there may be a plurality of versions in consideration of environments of terminals so that a contents version converted to be suitable to a terminal environment of the second terminal 200 may be transmitted to the second terminal 200 by the server 300 or contents may be stored in a single version but the server 300 may convert a contents file in consideration of environment information of the second terminal 200 and transmit the converted contents file to the second terminal 200.

Figure 6:
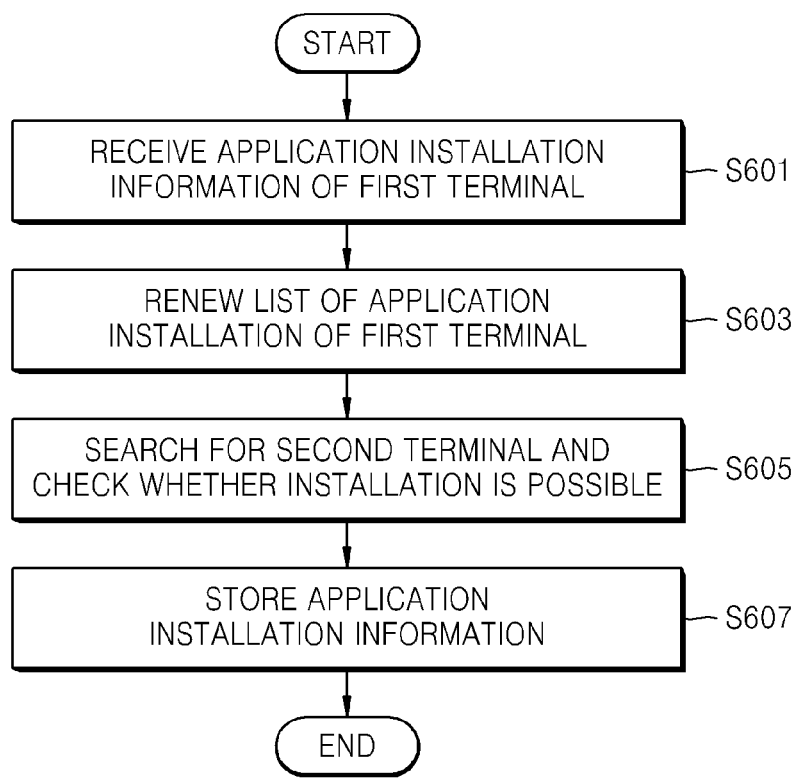
FIG. 6 is a flowchart illustrating an operation of processing information in a server, included in a method of automatically installing an application in different terminals according to an exemplary embodiment.

FIG. 6 is a flowchart illustrating an operation of processing information in the server 300 included in a method of automatically installing an application in different terminals, according to an exemplary embodiment.

Referring to FIG. 6, when the server 300 receives application installation information of the first terminal 100, from the first terminal 100 in operation S601, a list of application installations of the first terminal 100 stored in the server 300 is renewed with reference to the received application installation information in operation S603. Also, the server 300 searches for the second terminal 200 of the same user or for the second terminal 200, in which another application corresponding to an application of the first terminal 100 may be installed, to finally select the second terminal 200 in operation S605. To install an application in the second terminal 200 that is selected finally, the server 300 transmits a request message for installing the application in the second terminal 200, and when installation of the application is completed in the second terminal 200, the server 300 receives a message including information about the installation of the application from the second terminal 200 and renews the information about application installation with respect to the second terminal 200 in the server 300 and stores the same in operation S607.

Figure 7:
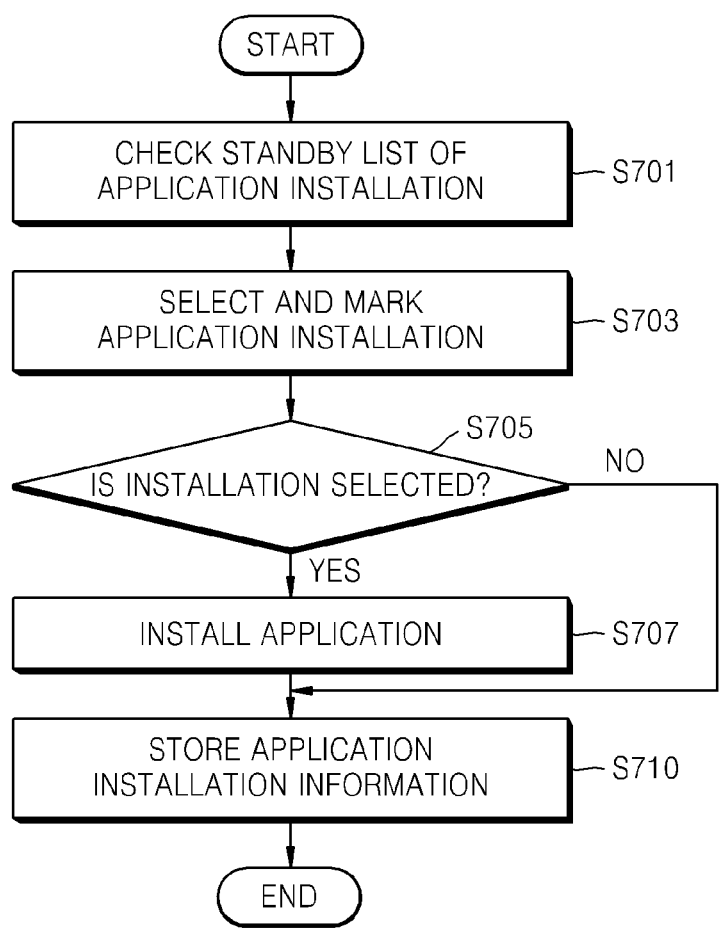
FIG. 7 is a flowchart illustrating an operation of installing an application when there is an installation standby list according to terminals, included in a method of automatically installing an application in different terminals according to an exemplary embodiment.

FIG. 7 is a flowchart illustrating an operation of installing an application when there is an installation standby list according to terminals, included in a method of automatically installing an application in different terminals according to an exemplary embodiment. According to the operation of FIG. 7, when the user of the second terminal 200 selects to install a corresponding application later or cancels installation or sets to install when installation is possible, the corresponding application may be included in an installation standby list so that installation of the corresponding application may be conducted according to a user input.

Referring to FIG. 7, the second terminal 200 checks an installation standby list of applications from the server 300 and receives a message including information about the installation standby list of applications in operation S701, and then the user of the second terminal 200 is inquired about whether to install an application in operation S703.

When the user of the second terminal 200 selects to install an application in operation S705, the second terminal 200 installs the application that is included in the installation standby list in operation S707, and transmits installation information of the application to the server 300 to renew application the installation information of the second terminal 200 in operation S710.

Figure 8:
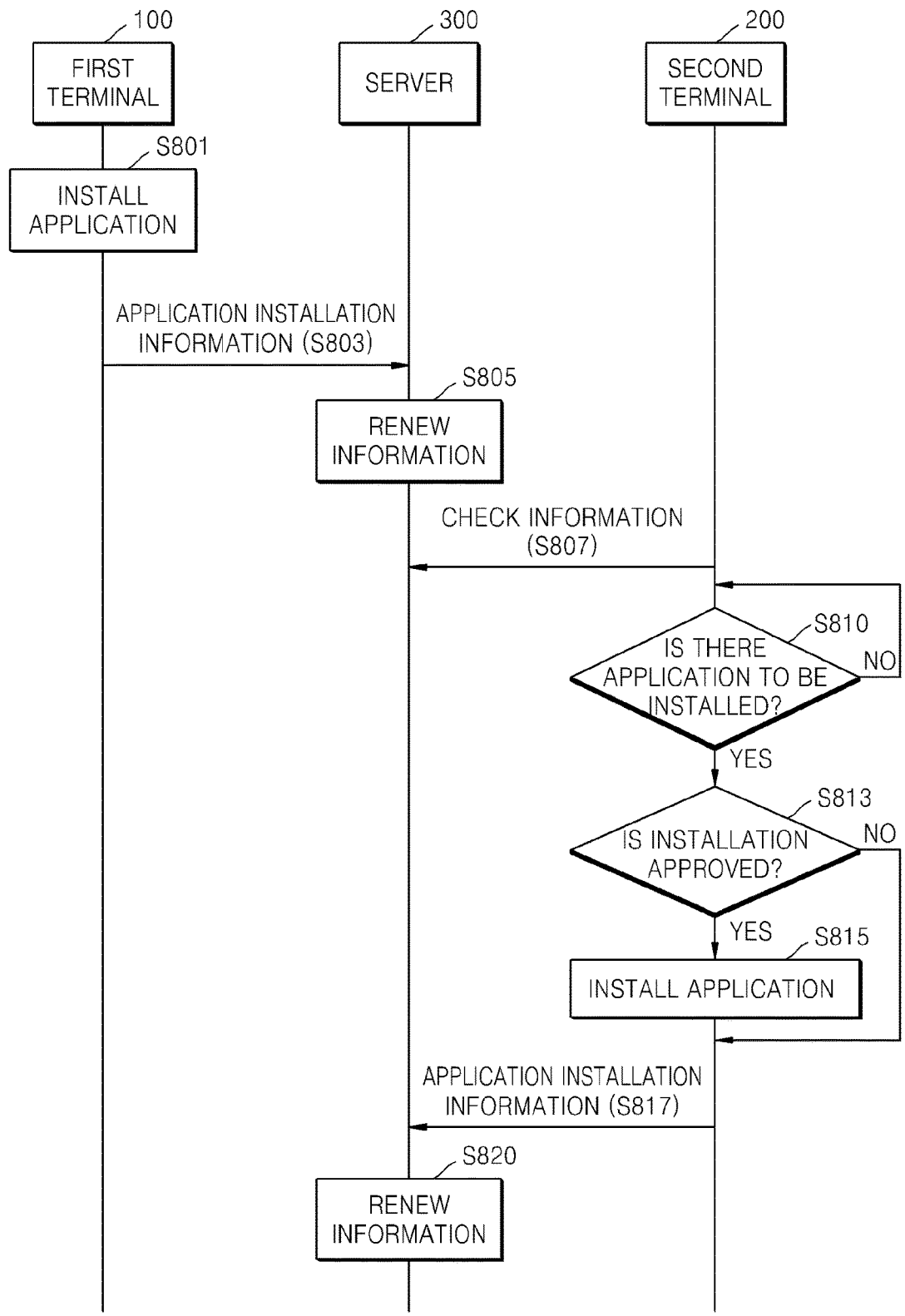
FIG. 8 is a flowchart illustrating a method of automatically installing an application in different terminals according to another exemplary embodiment.

FIG. 8 is a flowchart illustrating a method of automatically installing an application in different terminals according to another exemplary embodiment. According to the current exemplary embodiment, an application is installed, updated, or removed by directly connecting to the server 300 from the second terminal 200 and by referring to application information installed in other terminals. Also, contents may be stored, updated or removed in the same manner as applications.

Referring to FIG. 8, when an application is installed in a first terminal 100 in operation S801, the first terminal 100 transmits information about installation of an application to a server 300 in operation S803. The server 300 reflects the information about the installation of an application received from the first terminal 100, in terminal information 313 in operation S805. Then, a second terminal 200 connects to the server 300 periodically or at a preset time or according to a user request to check user information 312, terminal information 313 or the like in operation S807.

After the second terminal 200 checks the information stored in the server 300, when an application to be installed is found in operation S810, an inquiry whether to install the application is made to a user of the second terminal 200 in operation S813, and when the user of the second terminal 200 approves installation, the application is installed in operation S815. When the installation of the application is completed, the second terminal 200 transmits application installation information to the server 300 in operation S817, and reflects the same in the terminal information 313 of the second terminal 200 in the server 300 in operation S820.

According to the current exemplary embodiment, the application installation information is checked not in the server 300 but in the second terminal 200. In addition, not only installation but update or removal of the application may also be automatically conducted by connecting to the server 300 from the second terminal and checking relevant information thereto, and this also applies to contents.

According to the exemplary embodiments as described above, when a user wants to use an application in different terminals that are owned by the user, a function of automatically installing the application in the different terminals is provided. In addition to installation, removal or update of the application may also be automatically conducted in the different terminals by transmitting a message for requesting removal or update of the application from the server 300. Accordingly, the user may install, update, or remove an application in the different terminals owned by the user without repeated operations automatically or just simply through an approval process.

Also, when there are different versions of an application according to environments in which a terminal operates, the server 300 may recognize this and transmit a message including relevant information about the versions so that an application that is suitable for a predetermined terminal may be installed. In detail, when there are different versions of an application for various operating systems or when there are different applications for different types of terminals (e.g., TV, mobile devices, tablet PCs, etc.), an application suitable for each terminal may be installed.

In addition, when at least two applications are installed in different terminals for a single server and operate in connection with each one another, when an application is installed in a terminal, another application which is operable with the installed application may be easily installed in other terminals. For example, if a server application is installed in a TV, and a client application is installed in a mobile phone, and a single service is provided as the server application and the client application are linked to each other, the user may select one of the applications and install the same. Then, the other application may be automatically installed as the server 300 automatically transmits a request message for installing the corresponding application, to the terminal.

Also, when updating the same application or corresponding applications thereto installed in at least two terminals to a newer version, by updating one terminal first, the application installed in the other terminal which is owned by the user or regarding which a user has update rights may be automatically updated.

Moreover, an application may be installed by recommendation of a person who is determined to have a certain relationship with a user such as a friend or family member. A friend here refers to the concept of friends and family in regard to a SNS. It may be set such that another user may install an application in the terminal of the user according to set up of rights.

In addition, contents may also be processed in the same manner as applications according to the exemplary embodiments. When a user wants to use one type of contents in different terminals owned by the user, the corresponding contents may be automatically stored in the different terminals or may be stored by a simple approval process so as to easily use the corresponding contents in the different terminals. Also, when storing contents in another terminal, contents that are suitable for the corresponding terminal may be stored in consideration of environments of the another terminal so that the contents may be used appropriately.

The exemplary embodiments can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc.

While this application has been particularly shown and described with reference to exemplary embodiments thereof, it will be understood by those skilled in the art that various changes in form and details may be made therein without departing from the spirit and scope of the exemplary embodiments as defined by the appended claims. Therefore, the scope of the exemplary embodiments is defined not by the detailed description of the exemplary embodiments but by the appended claims, and all differences within the scope will be construed as being included in the exemplary embodiments.

What is claimed is:

1. A method of facilitating application installation in a second terminal of a user, the method comprising:
   receiving from a server, by the second terminal, an installation standby list comprising information relating to a plurality of applications available to be installed in the second terminal, the installation standby list being generated based on at least application installation information in a first terminal of the user;
   receiving, by the second terminal, a first user input selecting an application from the installation standby list;
   based on the first user input, inquiring, by the second terminal, whether to install the application;
   receiving, by the second terminal, a second user input selecting to install the application;
   transmitting, by the second terminal, information relating to the second user input;
   based on the information relating to the second user input, receiving, by the second terminal, a file transmission including an application installation file corresponding to the application; and
   installing the application in the second terminal based on the application installation file;
   receiving, by the second terminal, an update information for the installed application; and
   updating, by the second terminal, the installed application automatically using the update information.

2. The method of claim 1, wherein the installing the application in the second terminal comprises installing the application based on an installation environment of the second terminal.

3. The method of claim 1, wherein the application installed in the second terminal operates together with the application installed in the first terminal.

4. The method of claim 1, wherein the installation standby list is generated based on user installation rights information relating to whether the user is allowed to install the application on the second terminal.

5. The method of claim 1, wherein the update information is received by the second terminal in response to the application being updated by the first terminal.

6. The method of claim 1, wherein the first terminal is owned by the user and the second terminal is operated by the user.

7. A method of facilitating application installation in a second terminal of a user, the method comprising:
   receiving from a server, by the second terminal, an installation standby list comprising information relating to a plurality of applications available to be installed in the second terminal, the installation standby list being generated based on at least application installation information in a first terminal of the user;
   receiving, by the second terminal, a first user input selecting an application from the installation standby list;
   based on the first user input, inquiring, by the second terminal, whether to install the application;
   receiving, by the second terminal, a second user input selecting to install the application;
   transmitting, by the second terminal, information relating to the second user input;
   based on the information relating to the second user input, receiving, by the second terminal, a file transmission including an application installation file corresponding to the application; and
   installing the application in the second terminal based on the application installation file;
   receiving, by the second terminal, an update information for the installed application; and
   receiving, by the second terminal, a third user input selecting to update the application;
   in response to the receiving of the third user input, updating, by the second terminal, the installed application using the update information.

8. The method of claim 7, wherein the installing the application in the second terminal comprises installing the application based on an installation environment of the second terminal.

9. The method of claim 7, wherein the application installed in the second terminal operates together with the application installed in the first terminal.

10. The method of claim 8, wherein the installation standby list is generated based on user installation rights information relating to whether the user is allowed to install the application on the second terminal.

11. The method of claim 8, wherein the update information is received by the second terminal in response to the application being updated by the first terminal.

12. The method of claim 8, wherein the first terminal is owned by the user and the second terminal is operated by the user.

13. A method of facilitating application installation in a second terminal of a user, the method comprising:
   transmitting, by a server, an installation standby list to the second terminal, the installation standby list comprising information relating to a plurality of applications available to be installed in the second terminal, the installation standby list being generated based on at least application installation information in a first terminal of the user;

receiving, by the server, information relating to a user input selecting an application from the installation standby list from the second terminal;

based on the information relating to the user input, transmitting, by the server, a file transmission including an application installation file corresponding to the application to the second terminal; and transmitting, by the server, an update information for the application to the second terminal.

14. The method of claim 13, wherein the application installation file is selected based on an installation environment of the second terminal.

15. The method of claim 13, wherein the application operates together with the application installed in the first terminal.

16. The method of claim 13, wherein the installation standby list is generated based on user installation rights information relating to whether the user is allowed to install the application on the second terminal.

17. The method of claim 13, wherein the update information is transmitted by the server in response to the application being updated by the first terminal.

18. The method of claim 13, wherein the first terminal is owned by the user and the second terminal is operated by the user.

* * * * *